United States Patent [19]

Ito et al.

[11] 4,184,759
[45] Jan. 22, 1980

[54] PHOTOGRAPHIC APPARATUS

[75] Inventors: Fumio Ito; Mutsunobu Yazaki, both of Yokohama, Japan

[73] Assignee: Canon Kabushiki Kaisha, Tokyo, Japan

[21] Appl. No.: 819,571

[22] Filed: Jul. 27, 1977

[30] Foreign Application Priority Data

Jul. 30, 1976 [JP] Japan ................................. 51/91093

[51] Int. Cl.$^2$ ...................... G03B 17/50; G03B 17/04; G03B 13/02; G03B 3/00
[52] U.S. Cl. ...................................... 354/86; 354/187; 354/195; 354/219
[58] Field of Search ................. 354/187, 288, 25, 219, 354/192, 194, 195, 199, 83, 86

[56] References Cited

U.S. PATENT DOCUMENTS

| | | | |
|---|---|---|---|
| 2,618,209 | 11/1952 | Silent | 354/25 |
| 3,677,160 | 7/1972 | Harvey | 354/83 |
| 3,906,521 | 9/1975 | Ueda | 354/86 |
| 3,953,729 | 4/1976 | Hosoe et al. | 354/25 X |
| 3,979,763 | 9/1976 | Mills | 354/187 |
| 4,045,805 | 8/1977 | Saito | 354/25 |

*Primary Examiner*—Donald A. Griffin
*Attorney, Agent, or Firm*—Toren, McGeady and Stanger

[57] ABSTRACT

A photographic apparatus of the foldable type in which, when in preparation for photography, a front housing carrying a photographic objective lens system together with a focusing mechanism therefor is moved away from a rear housing to form an exposure chamber for a sensitive material loaded in the rear housing. When the apparatus is rearranged to a folded position, the front housing is brought into compact relation with the rear housing. Since a distance-measuring device is located in the rear housing, there is provided an electrical channel for establishing electrically operative connection between the focusing mechanism and the distance measuring device as arranged along a path between the front and rear housing which remains substantially unchanged in length during the erecting and collapsing operation of the apparatus.

12 Claims, 6 Drawing Figures

PHOTOGRAPHIC APPARATUS

BACKGROUND OF THE INVENTION

1. Field of the Invention

This invention relates to a compact collapsible photographic apparatus, and, more particularly, to a photographic apparatus having electrically operated focusing control by a distance measuring device.

2. Description of the Prior Art

A wide variety of compact collapsible photographic apparatus has been proposed, the most common design of which comprises a front housing having incorporated therein exposure determining means such as shutter means and diaphragm means and a photographic lens optical system and a rear housing having incorporated therein a film cassette chamber and a viewfinder optical system, the front and rear housings being coupled with each other and communicating with each other through a flexible interconnecting means such as a bellows, so that when preparing for photography, the flexible interconnecting means is expanded to create a space between the front and rear housings at a distance suited to perform photography, conversely when it serves no use for photography, the interconnecting means is folded with the front housing being finally positioned extremely close to the rear housing to achieve compactness of the photographic apparatus, as folded, for portable purposes.

In order to form a sharp image of an object to be photographed from a beam of light rays passing through the objective lens system at the exposure plane of a photographic film by moving at least a part of the objective lens system along an optical axis thereof, as the front and rear housings are set in a cooperative position, while allowing for the photographer to look through the finder optical system, it is known to provide an axial position adjusting mechanism for controlling adjustment of that movable part of the objective lens system in axial position relative to the remaining stationary part thereof as operatively connected with an apparatus-to-object distance measuring device, the latter being associated with the finder optical system. This conventional type of photographic apparatus, however, makes use of a mechanical linkage for operative connection between the axial position adjusting mechanism and the distance measuring device, thereby giving rise to a problem that the required structure of the linking mechanism is very complicated.

On the other hand, at the present time, there are available many photographic system of the self-developing type in which a sheet-shape photosensitive material unit having a rupturable pod of developing fluid carried in itself after its exposure is advanced toward the outside of a photographic camera past a development station provided in the camera, so that the developed photograph having a positive image formed on the same photosensitive material surface can be obtained in an instant.

As such sheet-shape photosensitive material or film unit is configured to a larger film format than that of a film adapted for use with an ordinary multi-purpose photographic camera which provides the exposed film of negative latent image which, after being developed, is used to produce a photographic print or prints of enlarged size, it is required that the self-developing photographic camera be provided with an exposure chamber of the larger dimensions compared with the ordinary photographic camera. Thus the bulk of the overall camera structure and the distance between the objective lens and the exposure plane of the film unit become large. What is required for the general photographic camera design is, however, to achieve comfortable handling of the camera for exposure operation and particularly for portability which enables the photographer to find his camera everywhere he goes. In the case of the self-developing cameras, therefore, it is very importance to achieve compactness of the camera structure. It is known to construct such camera from front and rear housings so that they communicate with each other through a flexible interconnecting means such as a bellows so that when this structure is of no use for exposure purposes, the front and rear housings are collapsed to a compact relation with each other by folding the flexible bellows. Conversely when in use, the bellows is expanded to create an exposure chamber between the front and rear housings spaced apart from each other by a distance suited for exposure purposes.

In this type of self-developing camera, when the provision of the aforementioned distance measuring device is made at the rear housing while nevertheless allowing the photographer to adjust the axial position of the movable part of the objective lens by looking through the finder, which is optically isolated from the objective lens, the employment of a mechanical linkage for operative connection between the position adjusting mechanism and the distance measuring device will lead to the difficulties of achieving high accuracy of position control adjustment without unduly large increase in the complexity of the mechanical linkage structure in question and without causing occurrence of mechanical interference between the linking mechanism and an erecting and collapsing mechanism by which the front and rear housings are rendered movable between the operative and inoperative positions this giving a disadvantage of increasing the production cost and the possibility of occurrence of malfunctions.

SUMMARY OF THE INVENTION

A first object of the present invention is to provide a novel compact collapsible photographic apparatus which has overcome the above mentioned drawbacks of the conventional apparatus.

A second object is to provide a photographic apparatus of the above character having front and rear housings movable between erected and collapsed positions and provided respectively with adjusting means for adjusting the axial position of an objective lens in part or wholly and with apparatus-to-object distance measuring means, whereby the operative connection between the adjusting and distance measuring means is constructed in the form of electrical circuit means of far simplified structure when compared with an otherwise necessary mechanical operative connection means to improve the accuracy and reliability of the position adjusting operation.

A third object concomitant with the second object of the invention is to provide a photographic apparatus of the above character which enables the photographer to perform adjustment of the axial position of the objective lens while looking through a finder which is optically isolated from the objective lens.

A fourth object concomitant with the second object of the invention is to provide a photographic apparatus of the above character in which an interconnecting means through which the front and rear housings communicate with each other in a light-tight manner is designed to have a portion which remains substantially unchanged in length between the front and rear housings during the erecting and collapsing operation thereof and at which an electrical channel means is arranged interconnecting the circuitry of the adjusting means with that of the distance measuring means.

A fifth object is to achieve an even more compact structure of the photographic apparatus of the above character in the collapsed state.

These and other objects and features of the present invention will become apparent from the following detailed description taken in conjunction with the accompanying drawings in which:

DESCRIPTION OF THE PREFERRED EMBODIMENTS

Figure 1:
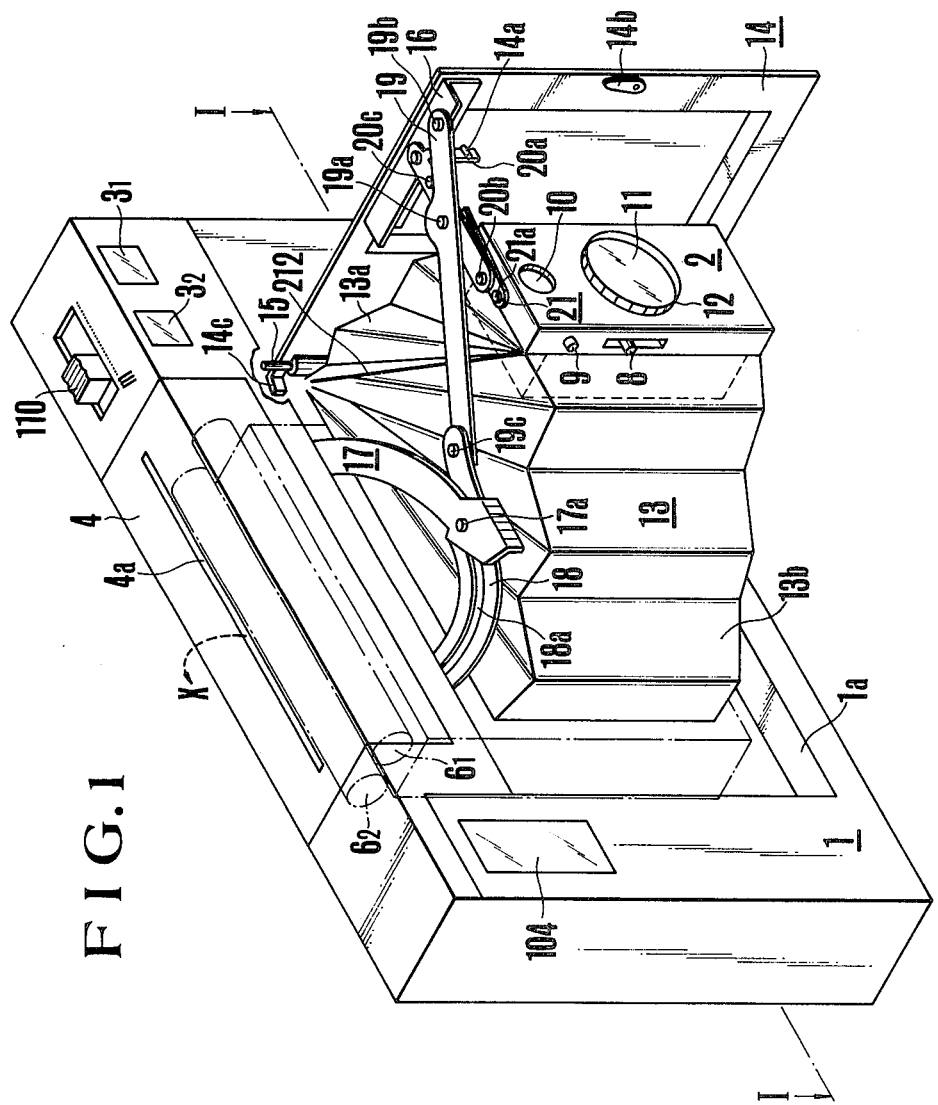
FIGS. 1 and 2 are perspective views of a compact collapsible photographic apparatus of the self-developing type in one form of the present invention with FIG. 1 showing an erected position of the apparatus and with FIG. 2 showing a collapsed position thereof.
Figure 2:
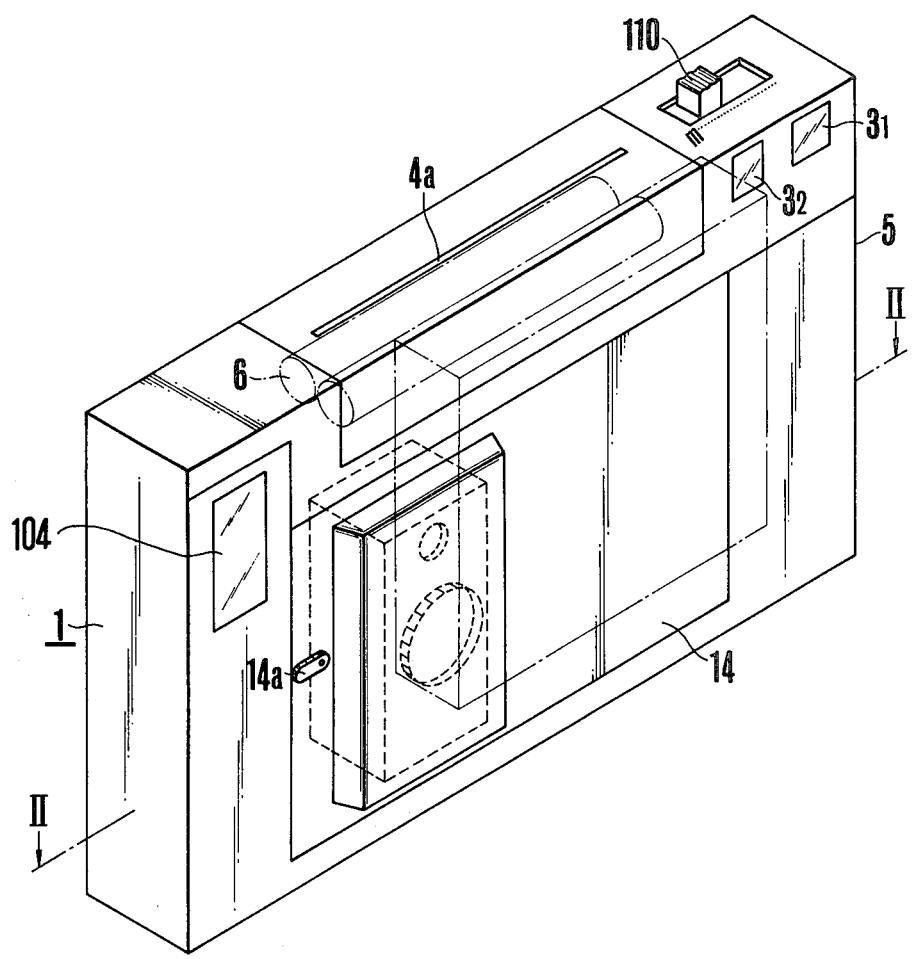

Referring to FIGS. 1 to 4, there is shown one preferred embodiment of a self-processing photographic apparatus structure according to the present invention, in particular, to illustrate those features of the invention which are intended to achieve compactness with the apparatus when collapsed and to insure that the electrically operative connection in the form of a rigid electrical cord is compatible with the folding section of the apparatus. Referring, at first, to FIG. 2, the photographic apparatus has a rear housing 1 with two windows 3₁ and 3₂ laterally spaced from each other in a right-hand upper corner of a front panel of the rear housing to constitute part of a double-image range finder distance measuring optical system which has a manually operable member or knob 110 extending through an opening provided through the upper wall of the rear housing 1, a front cover 14 arranged upon closure to a locked position by a locking lever 14a to cover the front area of a recess formed in the rear housing 1, and a film exit opening 4a through which an exposed and processed film unit 50 (see FIG. 3) is expelled from a film cassette chamber 5 by a pair of developing fluid spread rollers 6 to the outside of the apparatus. When the front cover 14 is released from the locked position and turned in a counter-clockwise direction about a pivot shaft 15 (see FIGS. 1 and 4), the apparatus is expanded by an erecting mechanism shown in FIG. 1.

The erecting mechanism comprises a spring-powered drive lever 17 pivotal about a pin fixedly mounted on the rear housing 1, an arcuate guide lever 18 pivotal about a pin fixedly mounted on the rear housing 1 and having an arctuate slot 18a into which a guide pin 17a extends away from the drive lever 17, a link 19 having one end pivotally mounted by a pin 19b on a bracket 16 fixedly mounted on the back side of the front cover 14 and the other end pivotally mounted on the free end of the guide lever 18 by a pin 19c, a control lever 20 pivotally mounted on the bracket 16 and having a protuberance 20a arranged upon completion of erecting operation to abut against a stop pin 14a perpendicularly rearwardly extending from the back side of the front cover 14, an interconnecting slidable pin 19a extending away from the link 19 and into a slot 20c in the control lever 20, and a paralleling lever 21 pivotally coupled to the free end of the control lever 20 by a pin 20b and pivotally carrying a front housing 2. This is done in a manner to insure that when the apparatus is either erected or collapsed completely, the principal planes of the front and rear housings are made parallel to each other, but during the process of erecting and collapsing operation, the front housing 2 is permitted to swing.

A flexible bellows 13 by which the front and rear housings 2 and 1 are interconnected with each other in a light-tight manner is designed to have a line 212 which arches between the front and rear housings 2 and 1 and which is stabilized against variation in length during the folding and expanding of the bellows 13. During the folding process of the bellows 13, a right-hand section 13a as divided by the line 212 starts to be folded as the front housing 2 swings in a counter-clockwise direction to the parallelism with the line 212, and almost simultaneously the remaining or left-hand section 13b is folded as can be seen from FIG. 3. Such procedure will be reversed during the expanding process of the bellows 13.

Incorporated in the front housing 2 are a photographic objective lens 11 with a lens mount 12 arranged upon rotation to move together with the lens 11 along the optical axis thereof, and an exposure determining mechanism having a charge member 8 and a trigger button 9 arranged upon depression to initiate a release of the exposure determining mechanism from the charged condition.

Figure 3:
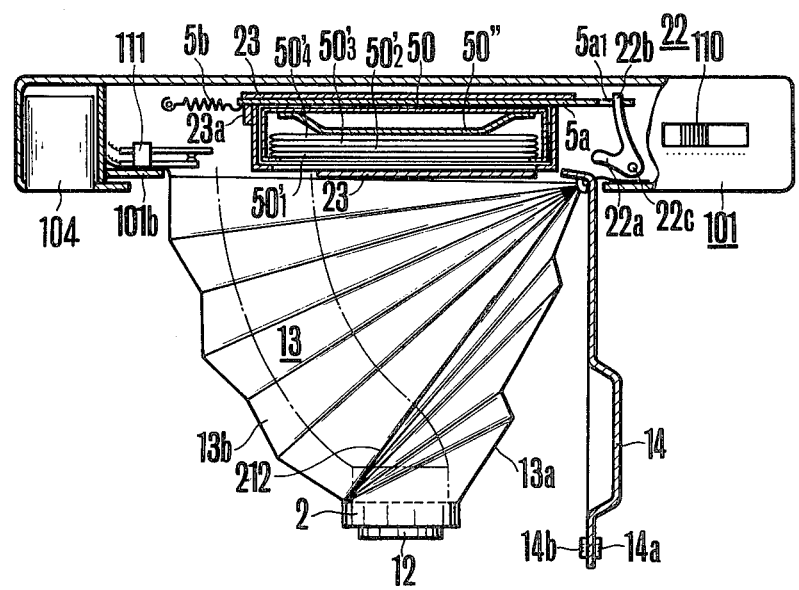
FIG. 3 is a sectional view taken along a line I—I of FIG. 1.
Figure 4:
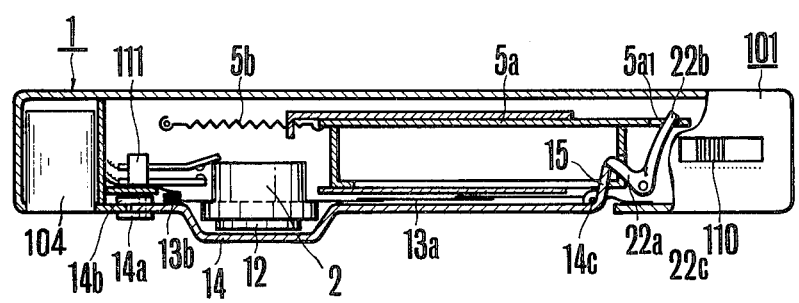
FIG. 4 is a similar view taken along a line II—II of FIG. 2.

Referring to FIGS. 3 and 4, the rear housing 1 is configured to provide a space with the front housing 2 and the film cassette chamber 5 are intended to occupy at a time in laterally aligned relation to each other as shown in FIG. 4. During the erecting process of the apparatus, as the front cover 14 is turned about the shaft 15 from the position shown in FIG. 4, a bent-off portion 14c is moved away from the path of movement of a one arm 22a of a L-shape lever 22, thereby the film cassette chamber framework 5a is driven for lateral movement to the left under the action of a tension spring 5b as guided by a pair of rails 23 and finally has occupied that portion of the aforesaid space which the front housing 2 had occupied, so that a picture framing aperture of the film cassette chamber 5 is brought into alignment with the objective lens 11 in the front housing 2 as shown in FIG. 3. Upon removal of an upper cover 4 (see FIG. 1), a film cassette 50 can be loaded into the chamber 5 with ease. An example of such film cassette 50 is disclosed in U.S. Pat. No. 3,682,076, where each film cassette 50 includes a plurality of sheet-shape photosensitive material units $50'_1$, $50'_2$, $50'_3$ and $50'_4$ of the self-developing type in stacked relation to each other, and a plate spring $50''$ which urges the sheet-shape photosensitive material unit $50_1$ closest to the picture framing aperture into the proper focal plane of the objective lens 11. Each photosensitive material unit includes a rupturable pod of processing fluid, and after its exposure is advanced by a drive mechanism from the film cassette 50 between the rollers $6_1$ and $6_2$ (see FIG. 1) at which the pod is ruptured by the compressive force exerted thereon, and then the photosensitive material is developed by the fluid cast away from the ruptured pod. The thus developed photosensitive material emanates from the elongated opening 4a to the outside of the apparatus.

During the collapsing process, as the front cover 14 is forced to turn in a clockwise direction by manipulating the erecting mechanism at the finger abutment formed in a free end portion of the drive lever 17, when the front housing 2 nears the rear housing 1, the bent-off portion 14c of the front cover 14 is brought into driving engagement with the arm 22a, thereby the L-shape lever 22 is turned in a clockwise direction about a pin 22c, while displacing the film cassette chamber 50 to the right in connection of another arm 22b of the L-shape lever 22 with an over-slotted opening $5a_1$ in an extension of the cassette chamber framework 5a. In this manner, a space which the front housing 2 is intended to occupy is created on the left side of the displaced cassetted chamber 5. Upon reception of the front housing 2 in the just mentioned space, a main switch 111 is opened as its movable contact is stuck by the rear edge of the front housing 2.

The folding operation of the photographic apparatus of such construction will next be explained in detail below. FIGS. 1 and 3 show the expanded condition of the photographic apparatus for capability of photographic operation. In order to fold the photographic apparatus from this expanded condition to the collapsed condition favorable for portability, the front cover 14 is turned clockwise while the bellows 13 is folded at the section 13a toward the boundary line 212 between the sections 13a and 13b by the link action of the levers 20 and 21. In this manner, the front housing 2 is caused to orient opposite to the backside of the front cover 14. A further clockwise movement of the front cover 14 causes counter-clockwise movement of the lever 18 by the link 19 which in turn causes clockwise movement of the lever 17 against the force of the spring, so that the bellows section 13b is folded toward the rear housing 1. During the turning movement of the front cover 14, the L-shape lever 22 is turned clockwise about the pin 22c by the bent-off portion 14c of the front cover 14 with the simultaneous occurrence of shifting movement of the film cassette chamber framework 5a toward the L-shape lever 22, thereby a space is created within the rear housing 1 to receive the front housing 2 therein. After the front cover 14 has closed, an opening 1a of the rear housing 1, the locking member 14a is manually turned to cause the locking pawl 14b to engage with a portion of the rear housing 1, so that the apparatus is locked in the collapsed position. Therefore, it is possible to limit the thickness of the collapsed photographic apparatus to a level dependent upon the axial thicknesses of the rear housing 1 and the front housing 2. According to the present invention, therefore, the photographic apparatus can be configured to have a very thin structure as shown in FIGS. 2 and 4.

Next, to expand the photographic apparatus from the collapsed condition to the erected condition for capability of photographic operation, the locking member 14a will be turned to disengage the locking pawl 14b from the portion of the rear housing 1. Thus, the drive lever 17 is permitted to turn counter-clockwise under the action of the spring, causing the guide lever 18 to turn clockwise. As the lever 18 is turned, the link 19 operates to open the front cover 14. The bellows 13 operates in a manner reverse to that in which the aforementioned folding operation proceeds. During the expanding process, the film cassette chamber framework 5a is moved to the left under the action of the spring 5b with simultaneous occurrence of counter-clockwise movement of the L-shaped lever 22 as the bent-off portion 14c of the front cover 14 is moved away from the L-shape lever 22, until the left end of the cassette chamber framework 5a abuts against a rectangularly bent-off portion 32a of the guide member 23. At this final state, the picture framing aperture of the cassette chamber 5 is accurately aligned with the objective lens 11, and the photosensitive material unit $50'_1$ is brought into coincidence at its image-receiving surface with the proper focal plane of the objective lens 11.

The present invention has been described with respect to the design feature of the overall photographic apparatus structure. In the following description, additional features of the invention will be disclosed, concerning with a novel device for electrically operative connection between distance measuring means provided in the rear housing 1 of the photographic apparatus of FIGS. 1 to 4 and position adjusting means for adjusting the axial position of the objective lens 11 provided in the front housing 2.

Figure 5:
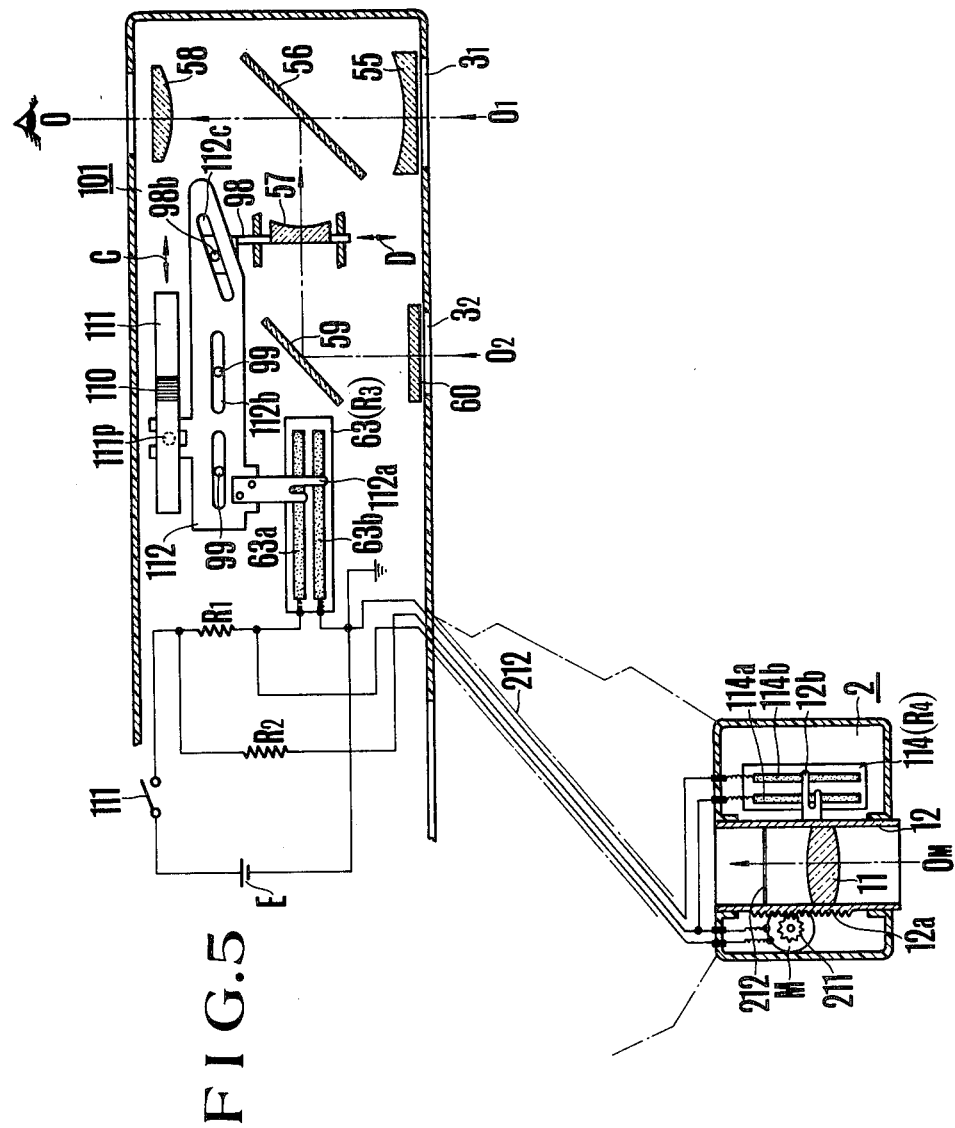
FIG. 5 is a schematic electrical circuit diagram of an example of an electrically operative connection device constructed in accordance with the present invention as associated with an electrically driven focusing mechanism and a manually operable distance measuring optical system.

FIG. 5 shows an example of a device adapted to control adjustment of the axial position of the photographic objective lens 11 in automatic response to manual operation of the distance measuring means of the doubled image coincidence type which is associated with a known viewfinder optical system of the inverted Galilean type. This optical system comprises first and second light arrangements having a common eye-piece 58 of convex configuration positioned adjacent an opening provided through the rear wall of the rear housing 1. The first light arrangement further includes an objective lens 55 of concave configuration positioned adjacent the first window $3_1$ (see FIGS. 1 and 2) on the common optical axis $0_1$ of the eye-piece 58. The second light arrangement further includes a half-mirror 56 positioned in the first light arrangement to make an angle of 45° with the optical axis $0_1$ thereof, a total reflection mirror 59 positioned behind the second window $3_2$ to cooperate with the half-mirror 56 in such a manner that a light ray $0_2$ entering at the center of the area of the window $3_2$ through a mark-carrying transparent plate 60 of acrylic resin is brought into coincidence with a light ray $0_1$ after reflection from the half-mirror 56, and a concave lens 57 having the same refractive power as that of the objective lens 55 and positioned at an intermediate point between the mirrors 56 and 59 to be movable in either direction perpendicular to the common optical axis $0_2$ of the eye-piece 58. In order to measure the distance between the photographic apparatus, in a strict sense, the point at which the optical axes of the lenses 55 and 57 intersect each other and an object to be photographed, the photographer will move the lens 57 by a control mechanism until two images of one and the same object which are frequently offset from each other at the initial come to coincidence with each other, while looking through the eye-piece 58 to aim the windows $3_1$ and $3_2$ at the object. This control mechanism comprises a slide plate 112 having two longitudinally elongated slots 112b into which respective guide pins 99 extend away from the rear housing 1 to permit movement of the slide plate 112 in either direction perpendicular to that in which the lens 57 is movable when a control member 111 having a manually operable knob 110 is moved in parallel to the slide plate 112, that is, in either direction indicated by the arrow C, as the control member 111 is operatively connected to the slide plate 112 by a pin 111P downwardly extending from the control member 111 into a recess of a forked portion of the slide plate 112. In order to transmit motion of the slide plate 112 to the lens 57, there is provided a cam means comprising a camming slot 112c formed in the slide plate 112 to incline at an acute angle with respect to the direction of the guide slots 112b, and a follower pin 98b engaging in the camming slot 112c and fixedly mounted on a support member 98 for the lens 57 which is arranged to be movable in the only directions perpendicular to the optical axis $0_2$ or indicated by the arrow D.

Such distance measuring system is operatively connected to a focusing mechanism for the photographic objective lens 11 which is adapted to be driven by an electrical motor M in automatic response to variation of the position of the slide plate 112. For this purpse, the slide plate 112 is provided with a variable resistor R3 which is constructed with electrically conductive and resistive material linear tracks 63a and 63b deposited on a common electrically insulating substrate 63 and oriented so that a slider 112c perpendicularly extending from the slide plate 112 is movable along the both tracks 63a and 63b in electrically contact relation. This variable resistor R3 is connected in one arm of a Wheatstone bridge circuit of which other two arms are constituted from respective fixed resistors R1 and R2 and which has two input terminals connected across an electrical power source or battery E through the main switch 111 of FIGS. 3 and 4. The two output terminals of the Wheatstone bridge circuit are connected to respective ends of a winding of the motor M by way of leads passing through the aforementioned electrical channel 212 of FIGS. 1 and 3. The output shaft of the motor M fixedly carries a pinion 211 meshing with a rack 12a formed in a portion of the lens mount 12. The axial position of the photographic objective lens 11 is sensed by a variable resistor R4 of similar construction to that of the variable resistor R3, that is, which is constructed with electrically conductive and resistive material linear tracks 114a and 114b deposited on a common electrically insulating substrate 114 and extending in parallel to the direction of movement of the lens mount 12 so that a slider 12b is movable along the tracks 114a and 114b in electrically contact relation when the lens mount 12 is automatically moved. The output of the variable resistor R4 is fed back to the Wheatstone bridge circuit by way of two leads, one of which is common to the motor M. It is to be noted again that these three leads may be assembled to form a single electrical cord and that this cord is fixedly mounted at the aforementioned boundary line A–B of FIGS. 1 and 3 which remains substantially unchanged during the erecting and collapsing of the bellows 13.

In operating the device for automatically controlling adjustment of the axial position of the photographic objective lens 11 of FIG. 5, the photographer locks to aim the finder optical system at an object to be photographed, and will manipulate the operable knob 110 for movement in either direction indicated by arrows C until an image of the object formed from a light beam entering through the second window $3_2$ coincides with an image of the same object formed from a light beam entering through the first window $3_1$ at his eye on the optical axis 0. Thus, the slide plate 112 is caused to move in the same direction to that in which the operable knob 110 was moved. Such movement of the slide plate 112 causes perpendicular movement of the lens support member 98 in either direction indicated by arrows D through the pin 98b-and-slot 112b connection which results in automatic adjustment of the position of the concave lens 57 to effect coincidence of the aforesaid two images of the same object, and also causes sliding movement of the slider 112a on the resistor substrate 63 with simultaneous variation of distance information introduced into the Wheatstone bridge circuit. As the distance is varied, the Wheatstone bridge circuit is made unbalanced to drive the motor M for rotation. Rotation of the motor M causes axial movement of the lens mount 12 with the objective lens 11 through the pinion 211-and-rack 12a meshing connection, thereby the position of the photographic objective lens 11 on the optical axis $0_M$ is varied. During the movement of the lens mount 12 along the optical axis $0_M$, the slider 12b varies its position on the variable resistor subtrate 114, while the information representative of the position of the objective lens 11 on the optical axis $0_M$ is created by the variable resistor R4 of the slider 12b and the variable resistor substrate 114 and introduced into the Wheatstone bridge circuit. When the resistance values R1, R2, R3 and R4 come to satisfy the relation for the balance of the Wheatstone bridge circuit, the motor M is stopped from further rotation. After all, the axial position of the photographic objective lens 11 has adjusted in response to the operation of the doubled image coincidence control knob 110.

Figure 6:
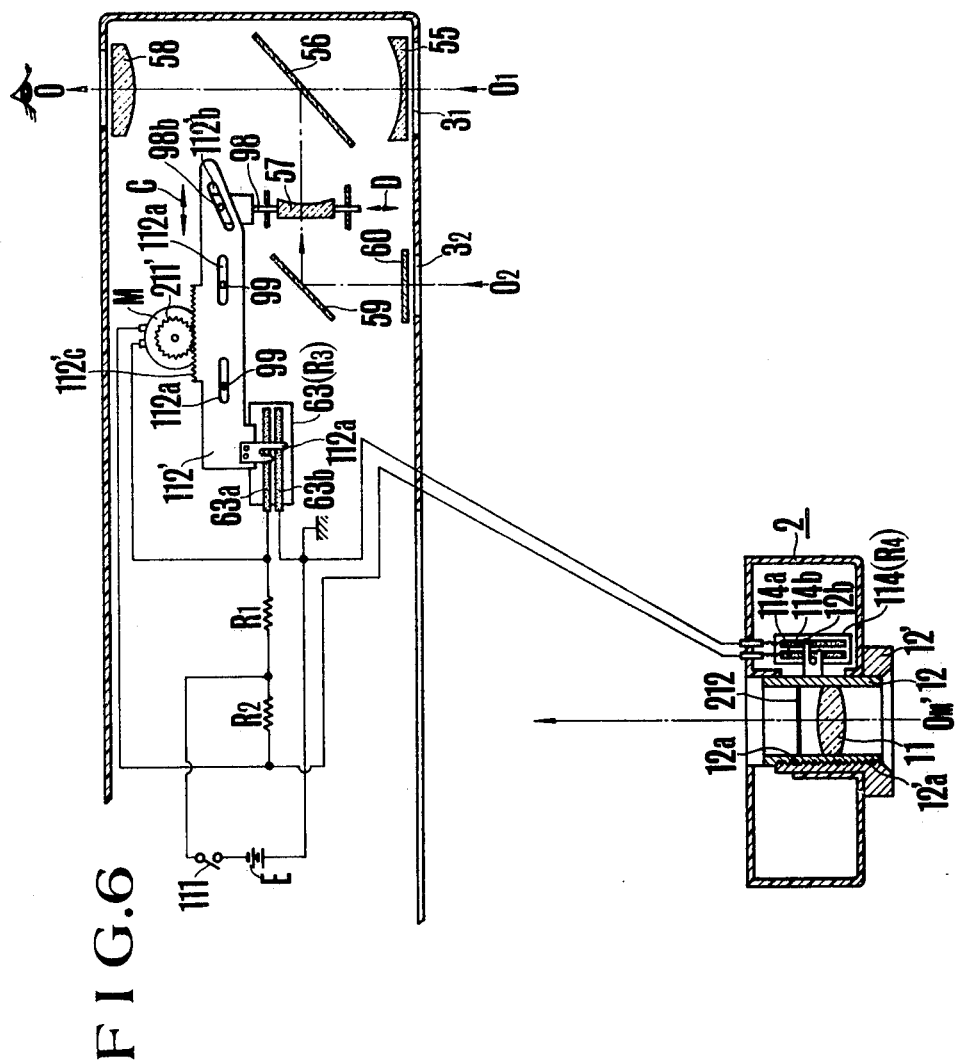
FIG. 6 is a similar view showing another example of the connection device of the invention.

FIG. 6 shows an example of modification of the electrically operative connection device of FIG. 5. In the figure, the same reference characters have been employed to denote the similar parts to those shown in FIG. 5. The examples of FIGS. 5 and 6 differ from each other in that the axial position of the photographic objective lens 11 is manually adjusted, while the information representative of the actual position of the photographic objective lens 11 on the optical axis $0_M$ is introduced into the Wheatstone bridge circuit so that the distance measuring system is automatically driven to uniform the photographer looking through the eyepiece 58 whether or not the axial position of the objective lens 11 on the optical axis $0_M$ is suited to a given object distance. In FIG. 6, the lens mount 12 is provided with a distance adjusting ring 12' rotatable relative to the front housing 2 and operatively connected to the lens mount 12 by a helicoid linkage of externally and internally threaded screws 12a and 12'a formed on the mount 12 and ring 12' respectively. Therefore, upon rotation of the distance adjusting ring 12', the lens mount 12 is moved along the optical axis $0_M$ in a direction dependent upon the direction of rotation of the distance adjusting ring 12'. A slidable plate 112' corresponds to the slide plate 112 of FIG. 5 and is engaged not with the doubled image coincidence control member 110 but with a motor M. In other words, the motor M is connected across the output terminals of a Wheatstone bridge circuit constituted from fixed resistors R1 and R2 and variable resistors R3 and R4, and a rack provided in the slide plate 112' normally engages with a pinion 211' affixed to the output shaft of the motor M.

In operating the operative connection device for controlling adjustment of the position of the photographic objective lens of FIG. 6, the photographer will turn the distance adjusting ring 12', while looking through the finder, thereby the lens mount 12 is moved along the optical axis $0_M$ by a distance dependent upon the amount of rotation of the distance adjusting ring 12'. In automatic response to the movement of the lens mount 12 along the optical axis $0_M$, as the slider 12b is slidingly moved on the variable resistor subtrate 114 to introduce the photographic objective lens position information as the resistor R4 into the Wheatstone bridge circuit, the motor M arranged in the rear housing 1 is driven for rotation until the balance of the Wheatstone's bridge circuit is regained. As the motor M is rotated, the slide plate 112' engaging with the pinion 211 affixed to the output shaft of the motor M at the rack 112'c formed in said slide plate 112', is caused to move in a direction dependent upon the direction of rotation of the motor M. As the slide plate 112' is moved in the direction of arrow C, the support member 98 which engages with the slide plate 112' at the cam slot 112'b is moved in the direction of arrow D, causing the concave lens 57 to move across the optical axis $0_2$ so that an image of the object formed from a light beam entering through the second window $3_2$ is brought into coincidence with an image of the same object formed from a light beam entering through the first window $3_1$, and that the slider 112a is slidingly moved to introduce distance information into the Wheatstone bridge circuit. Rotation of the distance adjusting ring 12' continues until the photographer looking through the finder recognizes the fact that the object image for the optical axis $0_1$ and the object image for the optical axis $0_2$ have come to coincide with each other.

As has been explained, the photographic apparatus of the present invention makes use of an electrical device for operative connection between a distance measuring system provided in the rear housing and an axial position adjusting mechanism for the photographic objective lens system provided in the front housing, so that the structure of the operative connection device between the rear housing and the front housing can be simplified, thereby giving the advantage of permitting employment of very simple production and assembling techniques.

What is claimed is:

1. A collapsible photographic apparatus comprising:
   (a) a front housing having:
      a photographic lens optical system;
      photographic lens optical system position adjusting means for moving at least a part of said photographic lens optical system along an optical axis thereof to adjust the position at which said photographic lens optical system forms an image on said optical axis;
      a motor for driving said photographic lens optical system position adjusting means; and
      lens optical system position information output means for producing an output corresponding to the movement of said movable lens optical system in said photographic lens optical system when said movable lens optical system is moved;
   (b) a rear housing having a photosensitive material receiving chamber into which a photosensitive material is loaded;
   (c) a distance measuring instrument for detecting the distance from said photographic apparatus to an object to be photographed, being arranged in said rear housing;
   (d) distance information output means for producing an output corresponding to distance detecting operation of said distance measuring instrument, said means being arranged in said rear housing; said distance information output means having indicating means for indicating in said finder that said distance measuring instrument has completed the distance detecting operation;
   (e) folding means capable of permitting said rear housing and said front housing to be moved from a state in which said rear housing and said front housing are largely spaced apart from each other to a state where said rear housing and said front housing are extremely close to each other in a folded condition, thereby at least a portion of said front housing is received in said rear housing;
   (f) electrical channel cord means for electrically interconnecting said front housing and said rear housing; and
   (g) electrical circuit means for driving said motor until the output of said lens optical system position output means and the output of said distance information output means become a predetermined relationship; said means being electrically connected through said electrical channel cord means to said lens optical system position information output means, said distance information output means and said motor.

2. A collapsible photographic apparatus as described in claim 1, wherein
   said electrical circuit means has a bridge circuit;
   said distance information output means has a double image coincidence type distance measuring instrument and a variable resistor constituting one branch of said bridge circuit and capable of varying the resistance value in response to the distance measuring operation of said distance measuring instrument; and
   said photographic lens optical system position adjusting means has a variable resistor constituting one branch of said bridge circuit and capable of varying the resistance value in response to the movement of said movable lens optical system.

3. A collapsible photographic apparatus as described in claim 1, wherein said electrical cord means is located along a member which is not varied in length within said folding means.

4. A collapsible photographic apparatus as described in claim 1, wherein said distance measuring instrument is constructed from a double image coincidence type distance measuring instrument.

5. A collapsible photographic apparatus as described in claim 1, wherein said folding means has a link mechanism interconnecting said front housing and said rear housing in a foldable manner and a bellows for assurance of light-shielding of a space formed between said front housing and said rear housing.

6. An instant photographic apparatus using a cassette containing sheet-shape photosensitive material having means for storage of a developer and capable, after its exposure, upon processing operation by said developer in said storage means, of forming a visible image, comprising:
   (a) a front housing having:
      a photographic lens optical system;
      a photographic lens optical system position adjusting means for moving at least a part of said photographic lens optical system along an optical axis thereof to adjust the position at which said photographic lens optical system forms an image on said optical axis, said means being operable from the outside of said front housing; and photographic lens optical system position information signal input means for providing a resistance value corresponding to the movement of said movable lens optical system when said movable lens optical system is moved;

(b) a rear housing having a cassette accommodating chamber into which said cassette is loaded; said rear housing having:

a finder optical device;

a distance measuring instrument provided to measure the distance from said photographic apparatus to an object to be photographed and to produce a signal corresponding to the distance; said distance measuring instrument having indicating means for indicating in said finder the fact that said distance measuring instrument has completed the distance detecting operation;

driving means for causing said distance measuring instrument to perform distance measuring operation; and photosensitive material advancing means for advancing said exposed photosensitive material to the outside of said rear housing, during a course of which said exposed photosensitive material is processed by said developer;

(c) folding means capable of permitting said rear housing and said front housing to be moved from a state where said rear housing and said front housing are largely spaced apart from each other to a state where said rear housing and said front housing are close to each other in a folded condition, whereby at least a portion of said front housing is received in said rear housing;

(d) cassette support means capable of moving said cassette loaded in said cassette accommodating chamber in said rear housing from an exposure position in said rear housing which is favorable for said photosensitive material to be exposed in said exposure position to form a space which said portion of said front housing occupies;

(e) electrical channel cord means for electrically interconnecting said front housing and said rear housing; and (f) balance circuit means for controlling said driving means; said means being electrically connected through said electrical channel cord means to said photographic optical position information signal input means and said distance measuring instrument, and the output terminals of said balance circuit means being connected to said driving means.

7. A photographic apparatus comprising:
(a) a front housing including:
a photographic lens optical system;
a photographic lens optical system position adjusting means for moving at least a part of said photographic lens optical system along an optical axis thereof to adjust the position at which said photographic lens optical system forms an image on said optical axis; and photographic lens optical system position information signal input means for providing a value corresponding to the movement of said movable lens optical system when said movable lens optical system is moved;

(b) a rear housing including:
a finder optical device; and
a distance measuring instrument provided to measure the distance from said phtoographic apparatus to an object to be photographed and to produce a signal corresponding to the distance; said distance measuring instrument having indicating means for indicating in said finder the fact that said distance measuring instrument has completed the distance detecting operation;

(c) driving means for driving at least one of said photographic optical position information signal input means and said distance measuring instrument in association with the operation of the other, said driving means including a motor;

(d) electrical channel cord means for electrically interconnecting said front housing and said rear housing; and (e) balance circuit means for controlling said drive means, said means being electrically connected through said electrical channel cord means to said photographic optical position information signal input means and said distance measuring instrument, the output terminals of said balance circuit means being connected to said motor;

wherein said balance circuit means includes a bridge circuit and wherein said distance measuring instrument has a double image coincidence type distance measuring instrument and a variable resistor constituting one branch of said bridge circuit and capable of varying the resistance value in response to the distance measuring operation of said double image coincidence type distance measuring instrument; said photographic lens optical system position adjusting means having a variable resistor constituting another branch of said bridge circuit and capable of varying the resistance value in response to the movement of said movable lens optical system.

8. An apparatus as described in claim 7, wherein said photographic lens optical system position adjusting means has movement control means for controlling said movement of said movable lens optical system and said motor for said driving means being connected to an output terminal of said bridge circuit and operatively coupled to said movement control means.

9. An apparatus as described in claim 7, wherein said double image coincidence type distance measuring instrument has a fixedly first optical system and a secondary optical system, said secondary optical system including at least one movable optical element being designed to be movable in corresponding to the distance of the object and said variable resistor responding to said movement of said movable optical element to change the resistance value.

10. An apparatus as described in claim 9, wherein said double image coincidence type distance measuring instrument has movement control means for controlling said movement of said movable optical element and said motor for said driving means being connected to an output terminal of said bridge circuit and operatively coupled to said movement control means.

11. An instant photographic apparatus using a cassette containing sheet-shape photosensitive material having means for storage of a developer and capable, after its exposure, upon processing operation by said developer in said storage means, of forming a visible image, comprising:
(a) a front housing having:

a photographic lens optical system;

a photographic lens optical system position adjusting means for moving at least a part of said photographic lens optical system along an optical axis thereof to adjust the position at which said photographic lens optical system forms an image on said optical axis, said means being operable from the outside of said front housing; and photographic lens optical system position information signal input means for providing a resistance value corresponding to the movement of said movable lens optical system when said movable lens optical system is moved;

(b) a rear housing having a cassette accommodating chamber into which said cassette is loaded; said rear housing having:

a finder optical device;

a distance measuring instrument provided to measure the distance from said photographic apparatus to an object to be photographed and to produce a signal corresponding to the distance; said distance measuring instrument having indicating means for indicating in said finder the fact that said distance measuring instrument has completed the distance detecting operation;

means for causing said distance measuring instrument to perform distance measuring operation; and photosensitive material advancing means for advancing said exposed photosensitive material to the outside of said rear housing, during a course of which said exposed photosensitive material is processed by said developer;

(c) folding means capable of permitting said rear housing and said front housing to be moved from a state where said rear housing and said front housing are largely spaced apart from each other to a state where said rear housing and said front housing are close to each other in a folded condition, so that at least a portion of said front housing is received in said rear housing;

(d) cassette support means capable of moving said cassette loaded in said cassette accommodating chamber in said rear housing from an exposure position in said rear housing which is favorable for said photosensitive material to be exposed in said exposure position to form a space which said portion of said front housing occupies; and (e) electrical channel cord means for electrically interconnecting said front housing and said rear housing.

12. The apparatus of claim 11, wherein said rear housing also includes:

driving means for driving at least one of said photographic optical position information signal input means and said distance measuring instrument in association with the operation of the other, said driving means including a motor; and balance circuit means for controlling said drive means, said means being electrically connected through said electrical channel cord means to said photographic optical position information signal input means and said distance measuring instrument, the output terminals of said balance circuit means being connected to said motor.

* * * * *